(12) United States Patent
Sisk

(10) Patent No.: US 11,718,035 B2
(45) Date of Patent: Aug. 8, 2023

(54) CUSTOMIZED, WEARABLE 3D PRINTED ARTICLES AND METHODS OF MANUFACTURING SAME

(71) Applicant: Printer Tailored, LLC, Germantown, WI (US)

(72) Inventor: Tyler J. Sisk, Cross Plains, WI (US)

(73) Assignee: PRINTER TAILORED, LLC, Germantown, WI (US)

( * ) Notice: Subject to any disclaimer, the term of this patent is extended or adjusted under 35 U.S.C. 154(b) by 0 days.

(21) Appl. No.: 15/116,871

(22) PCT Filed: Feb. 6, 2015

(86) PCT No.: PCT/US2015/014817
§ 371 (c)(1),
(2) Date: Aug. 5, 2016

(87) PCT Pub. No.: WO2015/120271
PCT Pub. Date: Aug. 13, 2015

(65) Prior Publication Data
US 2016/0349738 A1 Dec. 1, 2016

Related U.S. Application Data

(60) Provisional application No. 62/064,337, filed on Oct. 15, 2014, provisional application No. 61/937,217, filed on Feb. 7, 2014.

(51) Int. Cl.
*B33Y 50/00* (2015.01)
*B29C 64/386* (2017.01)
(Continued)

(52) U.S. Cl.
CPC .......... *B29C 64/386* (2017.08); *B29C 64/393* (2017.08); *B33Y 10/00* (2014.12);
(Continued)

(58) Field of Classification Search
None
See application file for complete search history.

(56) References Cited

U.S. PATENT DOCUMENTS 6,310,627 B1 * 10/2001 Sakaguchi ............. A41H 3/007
345/630
6,968,075 B1 * 11/2005 Chang ................ G06K 9/00214
382/111
(Continued)

FOREIGN PATENT DOCUMENTS

DE 102005023473 11/2006
GB 2434541 8/2007

OTHER PUBLICATIONS

Extended European Search Report for EP 15746463.7, dated Oct. 16, 2017, 9 pages.

*Primary Examiner* — Paul B Yanchus, III
(74) *Attorney, Agent, or Firm* — Casimir Jones SC; Tyler Sisk

(57) ABSTRACT

The present invention relates to three dimensional (3D) printed garments and any wearable article, as well as to processes and methods of manufacturing the same. Image information obtained from a subject, for example, images and information related to a subject's body or body part(s) is used to generate a garment or wearable object with a customized fit. In particular, the present invention provides the collection of a subject's data (e.g., using image acquisition devices, methods and software), and use of the data to create a model (e.g., virtual model) that in turn is used to create a subject specific article of clothing or other wearable object.

13 Claims, 3 Drawing Sheets

(51) Int. Cl.
   *B33Y 80/00*       (2015.01)
   *B29C 64/393*      (2017.01)
   *B33Y 10/00*       (2015.01)
   *B33Y 50/02*       (2015.01)
   *G05B 19/4097*     (2006.01)
   *B29L 31/48*       (2006.01)
   *B29L 31/00*       (2006.01)

(52) U.S. Cl.
   CPC .............. *B33Y 50/00* (2014.12); *B33Y 50/02* (2014.12); *B33Y 80/00* (2014.12); *G05B 19/4097* (2013.01); *B29L 2031/48* (2013.01); *B29L 2031/753* (2013.01); *G05B 2219/49023* (2013.01)

(56) References Cited

U.S. PATENT DOCUMENTS

| | | | | |
|---|---|---|---|---|
| 8,090,465 B2* | 1/2012 | Zeng | ................ | G16Z 99/00 700/132 |
| 8,655,053 B1* | 2/2014 | Hansen | ................ | G06Q 10/10 382/154 |
| 8,908,928 B1* | 12/2014 | Hansen | ............. | G06K 9/00362 382/111 |
| 9,773,274 B2* | 9/2017 | Curry | ................ | G06Q 30/0643 |
| 10,134,083 B2* | 11/2018 | Adeyoola | ............. | G06T 19/006 |
| 10,347,036 B2* | 7/2019 | Oldach | ................ | G06T 19/00 |
| 2001/0026272 A1* | 10/2001 | Feld | ................ | A41H 3/007 345/419 |
| 2002/0138170 A1* | 9/2002 | Onyshkevych | ........ | G06Q 30/06 700/130 |
| 2004/0049309 A1* | 3/2004 | Gardner | ................ | A41H 1/00 700/132 |
| 2006/0015207 A1* | 1/2006 | Weiser | ................ | G06Q 10/06 700/132 |
| 2006/0020482 A1 | 1/2006 | Coulter | | |
| 2007/0250203 A1* | 10/2007 | Yamamoto | ............. | G06F 30/20 700/132 |
| 2008/0109883 A1 | 5/2008 | Hernoud et al. | | |
| 2009/0316965 A1 | 12/2009 | Mailling et al. | | |
| 2010/0138193 A1* | 6/2010 | Summit | ................ | B33Y 50/00 703/1 |
| 2011/0298897 A1 | 12/2011 | Sareen et al. | | |
| 2013/0226528 A1* | 8/2013 | Hodgins | ................ | G06T 17/00 703/1 |
| 2013/0315475 A1* | 11/2013 | Song | ................ | G06K 9/00369 382/154 |
| 2014/0277663 A1* | 9/2014 | Gupta | ................ | G06F 17/50 700/98 |
| 2014/0277683 A1* | 9/2014 | Gupta | ................ | G06F 17/50 700/132 |
| 2014/0300907 A1* | 10/2014 | Kimmel | ................ | A41H 1/02 356/625 |
| 2015/0154691 A1* | 6/2015 | Curry | ................ | G06Q 30/0643 705/27.2 |
| 2015/0157822 A1* | 6/2015 | Karpas | ................ | G06V 40/193 700/98 |
| 2018/0253508 A1* | 9/2018 | Gupta | ................ | G06F 17/50 |

* cited by examiner

CUSTOMIZED, WEARABLE 3D PRINTED ARTICLES AND METHODS OF MANUFACTURING SAME

FIELD OF THE INVENTION

The present invention relates to three dimensional (3D) printed garments and any wearable article, as well as to processes and methods of manufacturing the same. Image information obtained from a subject, for example, images and information related to a subject's body or body part(s) is used to generate a garment or wearable object with a customized fit. In particular, the present invention provides the collection of a subject's data (e.g., using image acquisition devices, methods and software), and use of the data to create a model (e.g., virtual model) that in turn is used to create a subject specific article of clothing or other wearable object.

BACKGROUND OF THE INVENTION

Wearing a garment that does not fit properly may not only be embarrassing it often causes skin irritation, rash and chaffing, or even poor performance (e.g., for individuals engaged in an activity (e.g., sports, military operation, etc.). For example, those that participate in contact sports often wear pads or other types of protective gear (e.g., shin guards, mouth guards, helmets, etc.) that protect the wearer from physical contact with others or the environment. To date, obtaining protective gear specifically customized to fit a single individual has not been available.

Similarly, there are many types of garments and wearable clothing that require a nearly perfect fit, for example, a mask or respiratory worn in a setting to prevent spread of infectious disease, a piece of lingerie or body armor (e.g., a bullet proof vest). While these articles come in many different sizes, it is often the case that there is not a size available that properly fits a specific individual (e.g., the individual's body or portion thereof is too big or too small to fit properly into the closest available size). For example, today's intimates/lingerie market is predominately geared towards proportionately sized women. That is, most lingerie is made in sizes small, medium, and large. For women who are proportionately sized according the lingerie manufacturer's standards, finding well-fitting lingerie may not be a problem. However, there are great number of women who do not fit within the confines of the manufacturer's sizing standards.

To date, custom fit wearable objects/garments have either not been available or the cost associated with obtaining the same has been cost prohibitive.

SUMMARY OF THE INVENTION

The present invention relates to three dimensional (3D) printed garments and any wearable article as well as to methods of manufacturing same. Image information derived from a subject's data, for example images and information related to a subject's body or body part(s) is used in the generation of a garment or wearable object with a customized fit. In particular, the present invention provides the collection of a subject's data (e.g., using image acquisition devices, methods and software), and use of the data to create a model (e.g., virtual model) that in turn is used to create a subject specific article of clothing or other wearable object.

Accordingly, in some embodiments, the invention provides systems and/or methods of manufacturing a customized wearable article. In one embodiment, the system and/or method comprises providing a subject; obtaining image data regarding the subject's body or portion(s) thereof; creating a virtual image of the subject using the image data; selecting a virtual article from an article set, or creating a virtual article, using a creation tool; customizing the article utilizing the creation tool and the virtual image; and printing the article using a three dimensional (3D) printer. The invention is not limited by the type of subject. Indeed, systems, methods and articles of manufacture described herein may be utilized and/or worn by any subject including, but not limited to, humans, animals, inanimate objects and other subjects described herein. In like manner, the invention is not limited by the type of article. Articles of the invention include, but are not limited to, garments and other types of wearable articles/objects (e.g., that are worn on a subject's body) such as shirts, pants, vests, dresses, underwear, vests, suits, jackets, skirts, shoes, hats, glasses and/or glass frames, belts, athletic equipment (e.g., pads, guards, helmets, masks, and the like), masks or respirators (or portions thereof), diapers, mouth guards, armor, or other type of wearable objects described herein. Articles may be made of only one type of material, or, multiple (e.g. 2-10, 10-20, 20-30, 30-40, 40-50, 50-60, 60-70, 70-80, 80-90, 90-100, or more) types of material (e.g., in one or more layers, multiple types of materials printed in an intertwined manner, etc.). The customized, wearable articles may be a perfect fit or they may be generated in a size that enhances or reduces the physical appearance of a subject's body or body part(s). The obtaining image data regarding the subject's body or portion(s) thereof can be obtained by a variety of methods including, but not limited to, use of a 3D scanner or other type of recording device described herein. For example, non-limiting examples of recording devices include a camera (e.g., digital camera), video recorder (e.g., digital video recorder), structural capture camera, or design tool known in the art to capture information (e.g., shape, scale, dimensions, color, etc.) related to a subject (e.g., a subject's body or portion(s) thereof). In addition, a design tool (e.g., including, but not limited to, 123D Catch (AUTODESK, Inc.); Relievos; Youspin, Dermendar, etc.) can be used to capture data/information (e.g., shape, scale, dimensions, color, etc.). The invention is also not limited by the type of virtual image of the subject created. Indeed, multiple types of virtual images find use in the invention including, but not limited to, three dimensional (3D) surface images, spin images (e.g., 360 degree horizontal image, 360 degree vertical image, or a combination thereof (e.g., with subject being the target in the middle of the image)), or other type of virtual image described herein. In one embodiment, the virtual image is utilized to generate custom sizing information (e.g., specific dimensions and measurements of the part or parts of the object are determined using the virtual image). In another embodiment, the custom sizing information is utilized to generate customized articles/objects described herein. For example, image data (e.g., shape, size, scale and/or dimension) from the virtual image can be used (e.g., by a design tool) to customize (e.g., the size, shape, thickness, etc.) an article from an article/object set or to create a new article/object.

In another embodiment, the present invention provides systems and methods that permit a user to create a customized object/article locally (e.g., using means described herein for capturing subject data/information, transfer and/or downloading of the subject data/information (e.g., regarding a subject's body or portion(s) thereof) to a local pc, means described herein for converting the subject data/information into a virtual image (e.g., using computer aided design software (e.g., AUTOCAD, RAPIDWORKS, SOLID-WORKS or similar software described herein)) to create a virtual image on the local pc), means of using the virtual image to create a customized, virtual article/object on the local pc (e.g., using a software/creation tool on the local pc (e.g., that permits creating an article/object and/or for selecting an article/object from a list and customizing the article/object based upon the virtual image), sending the virtual article/object to a local printer (e.g., connected directly to the local pc), printing the article/object and subsequently enjoying the ability to use (e.g., wear) the article/object (e.g., as shown in FIG. 1). In one embodiment, capturing subject data/information is performed using a 3D scanner that generates a virtual image (e.g., a 3D virtual image (e.g., AUTOCAD, SOLIDWORKS or other type of electronic 3D image)) of the subject data/information (e.g., regarding a subject's body or portion(s) thereof (e.g., the 3D scanner captures subject data/information and generates a virtual image (e.g., a 3D virtual image (e.g., AUTOCAD, SOLID-WORKS or other type of electronic 3D image)))).

In some embodiments, the invention provides systems and methods that permit a user for to create a customized object/article (e.g., using means described herein for capturing subject data/information, transfer and/or downloading of the subject data/information (e.g., regarding a subject's body or portion(s) thereof) to a remote data server, means described herein for converting the subject data/information into a virtual image (e.g., use of AUTOCAD, RAPID-WORKS, SOLIDWORKS or similar software described herein to create a virtual image on the remote data server) or means of transferring a captured 3D virtual image (e.g., using a 3D scanner) to a remote data server, means of using the virtual image to create a customized, virtual article/object (e.g., using a software/creation tool (e.g., that permits creating an article/object and/or for selecting an article/object from a list and customizing the article/object based upon the virtual image), sending the virtual article/object to a printer (e.g., local and/or remote printer (e.g., connected via the internet), printing of the article/object (e.g., locally or remotely), and if printed remotely, shipping of the article/object (e.g., to a subject and/or specific location).

In some embodiments, the system includes a software/creation tool located on a server and/or computer (e.g., retailer/developer server and/or computer used by retailers and/or individual developers of article/objects to create a computer-readable script (e.g., encoding the virtual article/object), described herein, for the customizable article/object. In some embodiments, the software/creation tool comprises a program that runs on the developer's/retailer's computer, a local pc (e.g., as described above), or on a server (e.g., a data server) connected (e.g., via a network (e.g., the internet)) to developer's/retailer's computer. In some embodiments, the system comprises a data server that contains subject virtual image storage, virtual article/object storage, script storage, developer/retailer interface and/or a web server interface. In some embodiments, the software/creation tool interfaces with the data server via an interface (e.g. a retailer and/or developer interface), whereas a subject desiring object/article (e.g., an end user of the system) can use subject's computer to interface with the data server via the internet and web server interface.

In some embodiments, the system includes a print/order management server that receives and/or processes computer-readable script (e.g., print/order management server receives and processes script encoding the virtual article/object (e.g., created by user and/or customized by user using article/object from a list) and sends instructions to printer(s) via a printer interface to print article/object). In some embodiments, the print/order management server stores script encoding the virtual article/object in script storage. In one embodiment, a subject desiring object/article (e.g., an end user of the system) interfaces with system via the internet and web server interface. In one embodiments, a print/order management server interfaces with a retailer via retailer interface. The invention is not limited by the type or kind of retailer. Indeed, a retailer may be an existing retail company (e.g., AMAZON, TARGET, MACY'S, COSTCO, etc.), printing company (e.g. STRATASYS, Inc., MARK FORG3D, HEWLETT-PACKARD, Inc., MAKERBOT, Inc., 3D-SYSTEMS, Corp., The EXONE Company, VOXELJET AG, GROUP GORGE, Inc., CAMTEK LTD., ORGANOVO Holdings, Inc.), computer company (e.g., APPLE, MICROSOFT, IBM, DELL, etc.), or other company (e.g., that provides or desires to provide components of, or all of, the systems, methods and customized wearable articles of the invention). In one embodiment, the retailer is a combination of two or more retailers (e.g., a combination of AMAZON, STRATASYS, and MICROSOFT) that collectively provide the systems, methods and customized wearable articles of the invention).

In one embodiment, the invention provides a method of generating image data regarding the subject's body or portion(s) thereof, image data generated using the method, and methods of using the image data in a process for manufacturing customized wearable garments and/or objects. The invention is not limited by a particular method of generating the image data. In one embodiment, the image data is captured using a 3D scanner. The invention is not limited by the type of 3D scanner used. In one preferred embodiment, any 3D scanner that is useful for creating a point cloud of geometric samples on the surface of a subject's body or portion(s) thereof may be used, with the resulting points used to extrapolate the shape of the subject's body or portion(s) thereof (e.g., the points are used to electronically reconstruct the subject's body or portion(s) thereof). In one embodiment, the 3D scanner is a contact 3D scanner. In another embodiment, the 3D scanner is a non-contact 3D scanner. In one embodiment, a non-contact 3D scanner is an active scanner. In another embodiment, the non-contact 3D scanner is a passive scanner. In one embodiment, multiple scans of a subject's body or portion(s) thereof are performed (e.g., and brought into a common reference system (e.g., aligned or registered) and subsequently merged (e.g., to create a virtual model (e.g., in a 3D scanning pipeline process). Exemplary contact and non-contact 3D scanners are described herein. However, the invention is not limited to any particular 3D scanner. Indeed, any 3D scanner finds use in the invention. For example, in one embodiment, 3D gesture recognition and scanning technology (e.g., created by PRIMESENSE) is utilized. In another embodiment, the image data is captured using a traditional camera (e.g., digital camera, video recorder, structural capture camera, etc. (with a cone-like field of view that collects information about the surface of a subject's body or portion(s) thereof)). In a further embodiment, when a traditional camera is used, information about the surface of a subject's body or portion(s) thereof is converted into a virtual 3D image.

In one embodiment, the invention provides a method of obtaining a 3D virtual image of the surface of a subject's body or portion(s) thereof using a 3D scanner and subsequently using the 3D virtual image in a process for manufacturing customized wearable garments and/or objects. In another embodiment, the invention provides a method of obtaining information about the surface of a subject's body or portion(s) thereof using a camera (e.g., digital camera, video recorder, structural capture camera, etc. (with a cone-like field of view that collects information about the surface of a subject's body or portion(s) thereof)), converting the collected information into a 3D virtual image of the surface of a subject's body or portion(s) thereof, and using the 3D virtual image in a process for manufacturing customized wearable garments and/or objects. In another embodiment, the 3D virtual image is utilized to generate sizing information (e.g., specific dimensions and/or measurements of the subject's body or portion(s) thereof are determined using the virtual image). In one embodiment, the sizing information is utilized in order to manufacture a garment, or other wearable object described herein, that fits a subject's body or portion(s) thereof in a desired way (e.g., that is customized, using the sizing information, to fit the dimensions of a subject's body or portion(s) thereof).

In one embodiment, the invention provides a method of manufacturing a garment, or other wearable object described herein, comprising using sizing information (e.g., specific dimensions and/or measurements of a subject's body or portion(s) thereof) determined using a virtual image of the subject's body or portion(s) thereof, identifying (e.g., from an established list of items or generating de novo using a create tool) a virtual garment or other wearable object to be manufactured, running a process (e.g., in a software and/or firmware component of a computer) that configures the dimensions of the virtual garment or other wearable object to conform to the sizing information (e.g., that is customized to the sizing information), electronically sending (e.g., via local network or via the internet) the configured virtual garment or other wearable object to a 3D printer, and printing the garment. In one embodiment, the 3D printed garment is worn as printed. In another embodiment, the 3D garment/object is further processed (e.g., material is added to or removed from the printed garment/object) prior to wearing. For example, in one embodiment, after printing, a garment/object may be altered by a process such as trimming, sewing, affixing, tagging, painting, sticking or other process described herein. For example, in an embodiment wherein only a portion of a wearable article/garment is printed using the compositions and methods of the invention, additional material may be added to the printed article/garment post printing (e.g., glass lenses may be added to glass frames generated according to the invention, a filter may be added to a respirator generated according to the invention, a logo may be added to a shirt or vest generated according to the invention, a closing means (e.g., hook and eye, VELCRO, zipper, tie, etc.) may be added post generating a bra of the invention, etc.).

The invention is not limited by the type of 3D printer used to print a garment or other type of object described herein. Indeed, a variety of 3D printers find use in the invention including, but not limited to, a printer manufactured, designed, and/or sold by STRATASYS, Inc., MARK FORG3D, HEWLETT-PACKARD, Inc., MAKERBOT, Inc., 3D-SYSTEMS, Corp., The EXONE Company, VOXELJET AG, GROUP GORGE, Inc., CAMTEK LTD., ORGANOVO Holdings, Inc., or any other printer known in the art or described herein. In one embodiment, the 3D printer utilized is one that mixes materials while printing (e.g., prints an object/garment with two or more materials (e.g., plastic, rubber, carbon fiber, metal, etc.)). In a further embodiment, the 3D printer prints an object/garment with two or more materials intertwined (e.g., in order to change the look, feel, rigidity, and/or elasticity of the object/garment).

DETAILED DESCRIPTION OF THE INVENTION

Figure 1:
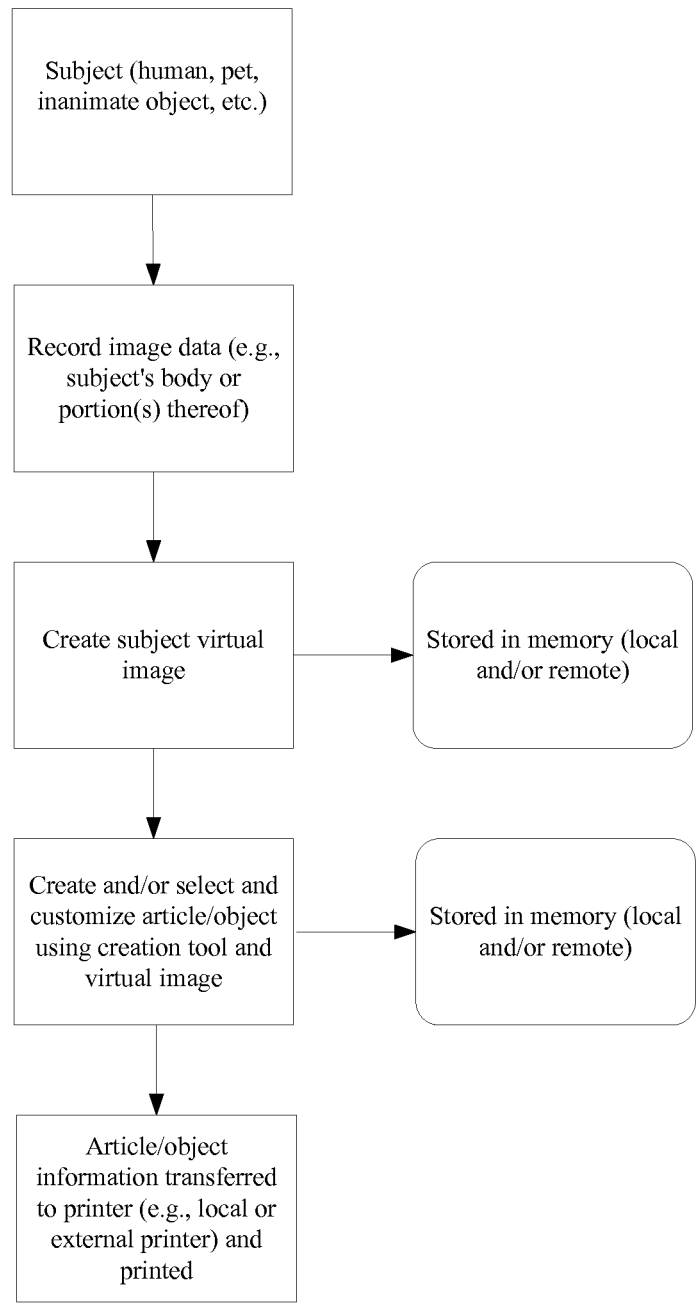
FIG. 1 shows a process flow diagram of an exemplary method of how a user may interact with the systems and methods of the invention in order to generate a customized article/object of the invention.

The present invention relates to three dimensional (3D) printed garments and any wearable object as well as to methods of generating and manufacturing same. Image information derived from a subject's data, for example, images of a subject's body or body parts, is used in the generation of a garment or other wearable article with a customized fit. In particular, the present invention provides the collection of a subject's data (e.g., using image acquisition devices, methods and software) and use of same to create a model (e.g., virtual model) that in turn is used to create a subject specific article of clothing or other wearable material.

The invention utilizes 3D printer technology to create unique, custom fit garments and other types of wearable articles/objects. In particular, the invention provides heretofore unavailable methods of manufacturing customized, wearable garments or other type of articles/objects described herein, as well as the customized, printed garments and/or wearable articles/objects. The terms "wearable object," "wearable article," "garments" and the like as used herein refer to items that are worn on a subject's body, thought of both in a traditional sense as articles of clothing (e.g., shirts, pants, vests, dresses, underwear, vests, suits, jackets, skirts, etc.), as well as articles/objects that may not be traditionally thought of as articles of clothing but that may nevertheless be worn on a subject's body such as shoes, hats, athletic equipment (e.g., pads, guards, helmets, masks, and the like), respirator masks, diapers, mouth guards, armor, or other type of wearable objects described herein. Indeed, the terms article, object and garment are meant to include any article of manufacture that a subject (e.g., human, animal (e.g., dog, horse, cat, etc.) may wear or be made to wear. Utilizing the methods of the present invention, a customized, wearable object may be generated and worn by a subject once and discarded, or, may be worn multiple (e.g. 2-10, 10-20, 20-30, 30-40, 40-50, 50-60, 60-70, 70-80, 80-90, 90-100, or more) times before the subject no longer finds use for the wearable object (e.g., the object is thrown out, recycled, or provided to another subject to wear). Wearable articles generated and worn, once or multiple times, according to the invention are described in detail herein.

In some embodiments, each step of the manufacturing process is performed at one location (e.g., within a retail store (e.g., located in a mall or shopping center), in a subject's home, etc.). In other embodiments, one or more steps of the process are performed in one location while other steps are performed at a second, third, fourth, or more locations. For example, in some embodiments, the step of obtaining image data is performed at a first location (e.g., within a subject's home (e.g., using a 3D scanner or camera and software for acquiring images of the subject's body and/or body part(s)), the step of utilizing the image data to create a virtual image of the subject is performed at the first or a second location, utilizing the virtual image to generate custom sizing information for garment or wearable article is performed at the first, second or third location, the step of sending sizing information to printer and instructing the printer to print the garment or wearable article is performed at the first, second, third or fourth location, and the printing of the wearable article takes place at the first, second, third, fourth or fifth location.

Figure 3:
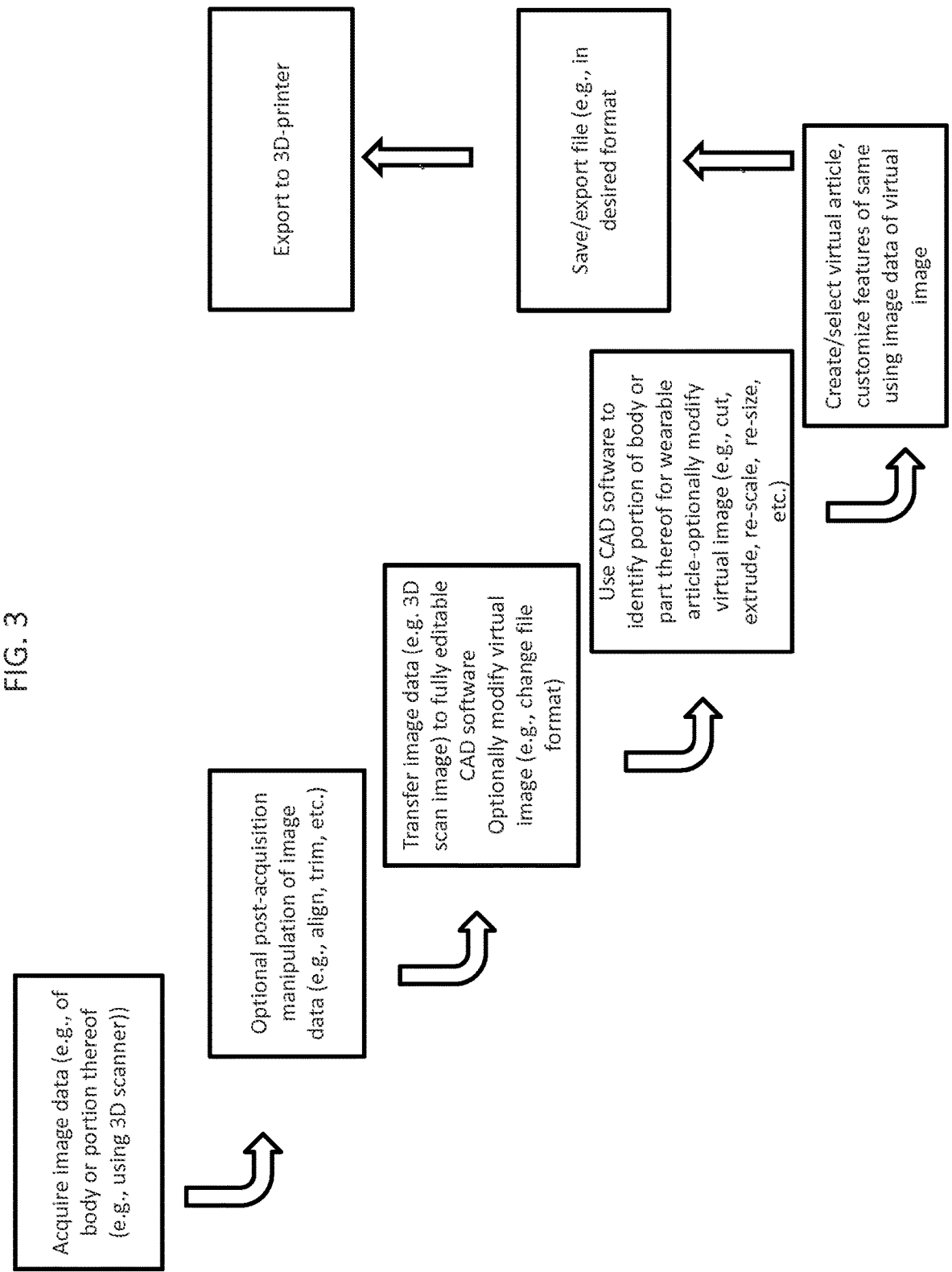
FIG. 3 shows a process flow diagram illustrating an example of how a user may interact with the systems and methods of the invention in order to generate a customized article/object of the invention.

Thus, in some embodiments, the invention provides methods of manufacturing a customized, wearable object. In other embodiments, the invention provides customized, wearable objects (e.g., generated according to methods described herein). As shown in FIG. 3, in some embodiments, a method of manufacturing a customized, wearable object comprises providing a subject (e.g., human, animal or other living subject) and obtaining image data regarding the subject's body or portion(s) thereof. In further embodiments, once image data regarding the subject's body or portion(s) thereof is obtained (e.g., using a recording device described herein), the image data is utilized to create a virtual image of the subject. In other embodiments, image data regarding the subject's body or portion(s) thereof is captured using a 3D scanner which also generates a virtual image of the subject's body or portion(s) thereof. The invention is not limited by the type of virtual image created. Indeed, multiple types of virtual images find use in the invention including, but not limited to, three dimensional (3D) surface images, spin images (e.g., 360 degree horizontal image, 360 degree vertical image, or a combination thereof (e.g., with subject being the target in the middle of the image)), or other type of virtual image described herein. Upon creation of a virtual image, in some embodiments, the virtual image is utilized to identify a part or parts of the subject upon which a garment or wearable article described herein is to be worn. In another embodiment, a 3D scanner is used to scan only that portion of a subject's body or portion(s) thereof upon which an article or garment is to be worn. Alternatively, in some embodiments, a 3D scanner is used to scan a larger portion of a subject's body or portion(s) thereof upon which an article or garment is to be worn, and the resulting image data of the 3D scan is modified (e.g., trimmed, aligned, cut) to result in a virtual image of only that portion of the subject's body upon which an article or garment is to be worn. Once the part or parts of the subject upon which a garment or wearable article is to be worn is identified, in some embodiments, the virtual image is utilized to generate custom sizing information (e.g., specific dimensions and measurements of the part or parts of the subject are determined using the virtual image). The custom sizing information is then utilized, in some embodiments, to generate customized, wearable articles described herein (e.g., using custom sizing information generated from the virtual image, a wearable article/object is created in a first, virtual sense (e.g., using a computer and/or software a wearable article/object is virtually created and then sent to a printer (e.g., a 3D printer described herein) upon which the customized, wearable article/object is printed). In some embodiments, the systems and methods of the invention utilize a creation tool (e.g., software that is located locally on a user's computer, or, software that is located remotely on a provider's/developer's computer) that allows a user to select a generic article/item from a list of articles/items in order to create a computer simulated/virtual wearable object/article (e.g., that is customized (e.g., size, shape, materials, layering of materials, etc.) using the creation tool). In some embodiments, the virtual wearable article/object is viewed on the virtual image prior to printing. The custom sizing information and/or the virtual wearable object/article may be stored (e.g., locally or remotely (e.g., in a memory component of a computer) for later use. A printer (e.g., 3D printer described herein) utilized to print a customized, wearable article may be a local printer (e.g., within the same site (e.g., building) as a computer upon which virtual image, custom sizing information and/or virtual wearable article/object is located) or it may be at a remote location (e.g., a different site (e.g., different building, different city, different state, or a different country) where the printer receives the custom sizing information and/or virtual wearable article/object information for printing. The invention is not limited by the type of printer utilized to print a wearable object of the invention. Indeed, any printer capable of printing wearable objects/articles of the invention and known in the art may be utilized. In some embodiments, if the printer is a local printer, the subject will have the wearable object/article for immediate use. In other embodiments, if the printer is a remote printer, the wearable object/article is mailed to the subject or picked up. Thus, the invention provides systems and methods for creating a subject specific wearable article of clothing or other wearable object described herein.

The invention is not limited to any particular subject. Indeed, the systems, methods and articles of manufacture described herein may be utilized by any subject regardless of age, size, and gender. Moreover, while human subjects are preferred users of systems, methods and articles of manufacture of the invention, in other preferred embodiments, an animal (e.g., domesticated animal (e.g., a pet)) may also utilize and/or benefit from systems, methods and articles of manufacture of the invention (e.g., as described herein, information related to an animal's body or portion thereof may be captured, converted into a virtual, digital file and/or model, a customized, wearable article created and/or identified, printed and subsequently worn by the animal). In some embodiments, the subject is an inanimate object (e.g., vehicle (e.g., car, truck, ATV, etc.), boat, snowmobile, ski or pair of skis, trailer, gun, tool, power tool, helmet, etc.) for which an article or object is made using the systems and methods described herein, to hold or cover (e.g., partially or completely).

Accordingly, in some embodiments, the invention provides systems and methods for manufacturing a customized wearable object comprising providing an inanimate object (e.g., a car) and obtaining image data regarding the object or portion(s) thereof. Once image data regarding the object or portion(s) thereof is obtained (e.g., using a recording device described herein), the image data is utilized to create a virtual image of the object or portion thereof. Upon creation of a virtual image, in some embodiments, the virtual image is utilized to identify a part or parts of the object upon which an object or article described herein will be placed (e.g., on the grill, over the entire car, etc.). Once the part or parts of the object upon which an object or article is to be placed is identified, in some embodiments, the virtual image is utilized to generate custom sizing information (e.g., specific dimensions and measurements of the part or parts of the object are determined using the virtual image). The custom sizing information is then utilized, in some embodiments, to generate customized articles/objects described herein (e.g., using custom sizing information generated from the virtual image, a wearable article/object is created in a first, virtual sense (e.g., using a computer and/or software an article/ object is virtually created and then sent to a printer (e.g., a 3D printer described herein) upon which the customized article/object is printed). In some embodiments, the virtual article/object is viewed on the virtual image prior to printing. The custom sizing information and/or the virtual object/article may be stored (e.g., locally or remotely (e.g., in a memory component of a computer) for later use. A printer (e.g., 3D printer described herein) utilized to print a customized article/object may be a local printer (e.g., within the same site (e.g., building) as a computer upon which virtual image, custom sizing information and/or virtual article/object is located) or it may be at a remote location (e.g., a different site (e.g., different building, different city, different state, or a different country) where the printer receives the custom sizing information and/or virtual article/object information for printing).

Once a subject (e.g., human, animal, or other type of subject described herein) is identified, systems and methods of the invention are utilized to acquire image data/information regarding the subject (e.g., the subject's body or portion(s) thereof). The invention is not limited by the type of device utilized to acquire image data/information. In some embodiments, the invention utilizes any device that is capable of acquiring the appearance and/or shape of the subject. Thus, in some embodiments, once a subject is provided, a device is utilized to capture surface features (e.g., shape, size, dimensions, appearance, etc.) of the subject (e.g., a disrobed subject). In one embodiment, a 3D scanner is utilized to capture surface features (e.g., shape, size, dimensions, appearance, etc.) of the subject. In another embodiment, a camera (e.g., digital camera), video recorder (e.g., digital video recorder) or design tool known in the art is used to capture information (e.g., shape, scale, dimensions, color, etc.) related to a subject (e.g., a subject's body or portion(s) thereof (e.g., shin, thigh, leg, foot, ankle, arm, wrist, chest, neck, head, face, ear, waist, torso, etc.). In some embodiments, the invention utilizes a structural capture camera (e.g., from LYNX Laboratories, Texas) to capture information (e.g., shape, scale, dimensions, color, etc.) related to a subject's body or portion thereof. In other embodiments, a digital camera (e.g., digital SLR, smartphone camera, compact digital camera, professional digital camera, etc.) in combination with a design tool (e.g., including, but not limited to, 123D Catch (AUTODESK, Inc.); Relievos; Youspin, Dermendar, etc.) is used to capture data/information (e.g., shape, scale, dimensions, color, etc.). The captured data/information is stored on a memory component. As used herein, the terms "memory," memory component," "memory device" and the like are used to refer to computer memory types including, but not limited to, random access memory (RAM) (e.g., DRAM (e.g., DDR, SDRAM), SRAM, T-RAM, Z-RAM, TTRAM) and read only memory (ROM) (e.g., mask ROM, PROM, EPROM, EEROM, NVRAM, flash memory) as well as to the types of mechanical devices utilized to host/hold same (e.g., magnetic tape, hard drive, optical drive, CD, DVD, and other storage media known in the art).

In some embodiments, captured information (e.g., shape, scale, dimensions, color, etc. of a subject of portion(s) thereof) is utilized to generate a fly around scene (e.g., 360° view) of the subject (e.g., including size, scale, dimensions and other features of a subject (e.g., subject's body or portion(s) thereof upon which a wearable object may be worn). For example, in some embodiments, 360° hemispherical and/or spherical view of the subject or portion(s) thereof are generated (e.g., using HTML5/FLASH (e.g., on a background (e.g., a white or transparent background)).

A subject's image data/information (e.g., acquired as described herein) is utilized to generate a virtual image of the subject. For example, in some embodiments, a subject's image data/information (e.g., subject's captured information (e.g., shape, scale, dimensions, color, etc.) related to a subject's body or portion(s) thereof) is converted into, or used to generate, a digital/virtual model (e.g., using computer-aided design (CAD) or other type of virtual drawing (e.g., of the subject's body or a portion(s) thereof)). The invention is not limited by the type of software utilized. Indeed, any software useful for generation and/or manipulation of virtual images may be used including, but not limited to, software created and/or sold by AUTODESK, DASSAULT SYSTMES S.A., EXA Corp., PTC, Inc., CIMATRON, Ltd., NEXTENGINE, Inc., ANSYS, Inc., FARO Technologies, Inc., or other provider known in the art. Thus, in some embodiments, the invention utilizes CAD software to generate a virtual image of a subject or portion(s) thereof. CAD software for virtual model generation may use vector-based graphics (e.g., to generate and depict a virtual model the subject) and/or may use/produce raster graphics (e.g., that depict overall appearance of virtual subject). In some preferred embodiments, the invention utilizes AUTOCAD (e.g., for desktop applications, mobile applications, web-based applications, cloud-based applications, etc.) for generation and use of 2D and 3D virtual models. A virtual image/model (e.g., a virtual geometric model of a subject or portion(s) thereof generated utilizing CAD and/or computer-aided geometric design) provides access to specific sizing information of the subject or portion(s) thereof. For example, in some embodiments, CAD is used to design a virtual image of a subject or portion thereof including, but not limited to, a subject's specific anatomical structures in two-dimensional (2D) space as well as a surface map of a subject or portion(s) thereof in three-dimensional (3D) space. In some embodiments, CAD is used to produce an animation and/or simulation of a subject.

In one embodiment, a 3D scanner is utilized to generate a virtual image of a subject and/or object described herein. For example, in some embodiments, a subject's image data/information (e.g., subject's captured information (e.g., shape, scale, dimensions, color, etc.) related to a subject's body or portion(s) thereof) is captured and/or generated utilizing a 3D scanner (e.g., that creates a digital/virtual model of the subject's body or a portion(s) thereof)).

A 3D scanner may be used to create a point cloud of geometric samples on the surface of the subject. These points can be used to extrapolate the shape of the subject (a process called reconstruction). If color information is collected at each point, then the colors on the surface of the subject can also be determined.

3D scanners share several traits with cameras. Like cameras, they have a cone-like field of view, and like cameras, they can collect information about surfaces that are not obscured. While a camera collects color information about surfaces within its field of view, a 3D scanner collects distance information about surfaces within its field of view. The "picture" produced by a 3D scanner describes the distance to a surface at each point in the picture. This allows the three dimensional position of each point in the picture to be identified.

In one embodiment, a single scan is used to generated a virtual model. In another embodiment, a plurality (e.g., 2-10, 10-20, 20-40, 40-100, more than 100) of scans is used to generate a virtual model of a subject and/or object. In embodiments where multiple scans are used to generate a virtual model, each scan can be aligned and/or registered (e.g., into a common reference system) and then merged to create the virtual model.

The invention is not limited by the type of technology utilized to acquire the shape of a subject and/or object. In one embodiment, the technology is a contact technology (e.g., that probes a subject and/or object through physical touch (e.g., using a carriage system with rigid arms held tightly in perpendicular relationship and each axis gliding along a track, an articulated arm with rigid bones and high precision angular sensors, and/or a combination thereof). In one embodiment, the 3D scanner is a contact coordinate measuring machine. In another, the technology is a non-contact (e.g., active or inactive) technology. In another embodiment, the technology is a non-contact technology such as an active scanner (e.g., that emits a type of radiation or light to detect subject/object reflection or radiation passing through object in order to probe an object or environment. The invention is not limited by the type of active scanner. Indeed, any type of active scanner known in the art may be utilized including, but not limited to, light (e.g., structured light, modulated light), laser, ultrasound, x-ray, time of flight laser (lidar), or other type of active scanning known in the art. In one embodiment, the scanner is a computed tomography imaging device. In another embodiment, the scanner is a magnetic resonance imaging device. In one embodiment, the scanner is a passive, non-contact scanner such as a stereoscopic system, photometric system, or a silhouette system.

The invention is not limited by the type of digital/virtual model. In some embodiments, the digital model is a three dimensional (3D) model of a subject's image data/information (e.g., captured data/information related to the subject's body or portion thereof). In some embodiments, the digital model represents a functional capture of information related to a subject. For example, as described herein, the invention provides functional capture of information related to a subject and the generation of a 3D (e.g., a detailed 3D) model (e.g., including characteristics such as, but not limited to, size, dimensions, scale, shape, color, or any recordable feature). In some embodiments, the digital model is a digital surface model (DSM) (e.g., of the subject's body or portion(s) thereof). The invention is not limited by the type of virtual image created. Indeed, multiple types of virtual images find use in the invention including, but not limited to, three dimensional (3D) surface images, spin images (e.g., 360 degree horizontal image, 360 degree vertical image, or a combination thereof (e.g., with subject being the target in the middle of the image)), or other type of virtual image described herein.

A virtual image/model (e.g., CAD or other type of virtual drawing (e.g., of the subject's body or a portion(s) thereof)) can be stored (e.g., temporarily or permanently) on a memory component. Once obtained, the virtual image/model can be utilized (e.g., using computer-aided design (CAD) or other type of virtual drawing software) to generate specific size and dimension information for a wearable article/object of the invention (e.g., selected from an article/object set described below). For example, upon generation of a virtual image, in some embodiments, the virtual image is utilized to identify a part or parts of the subject upon which a garment or wearable article described herein is to be worn. Once the part or parts of the subject upon which a garment or wearable article is to be worn is identified, in some embodiments, the virtual image is utilized to generate custom sizing information (e.g., specific dimensions and measurements of the part or parts of the subject are determined using the virtual image (e.g., using a creation tool (e.g., software)). In further embodiments, software is used for architectural rendering, object modeling, digital measuring (e.g., to generate digital measurement of a subject's body dimensions (e.g., all or a portion of a subject's body)). In some embodiments, a creation tool (e.g., software) is utilized to create a virtual, wearable object on a portion of a the virtual subject image (e.g., a vest is virtually drawn over the subject). In further embodiments, a visual representation of a wearable object is generated using the creation tool (e.g., software) for a user to virtually pick out and choose (e.g., on a computer screen) exactly how the user wants the article/object to fit and look (e.g., prior to the object being printed using a printer). In some embodiments, the wearable object is selected and customized from a database of objects (e.g., present within the creation tool). In other embodiments, the wearable object/article is created using software for a more "one of a kind" item/fit (e.g., fit, appearance and/or feel). In some embodiments, the digital measurements are used to fit a wearable object in a nearly perfect way upon a subject's body. In other embodiments, the digital measurements are used to augment a portion of a subject's body (e.g., a subject's shoulders, chest, arms, legs, or other body part). In some embodiments, the digital measurements are used to reduce or slim a portion of a subject's body (e.g., a subject's waist, stomach, legs (e.g., via printing compression garments based upon a subject's actual, recorded body dimensions (e.g., that slim or reduce in appearance the size a portion of the subject's body).

Accordingly, the invention provides using information generated from the virtual image (e.g., shape and sizing information), to create a wearable article/object in a first, virtual sense (e.g., using a computer and/or software a wearable article/object is virtually created) with subsequent transfer of article/object information to a printer (e.g., a 3D printer described herein) upon which the customized, wearable article/object is printed. The printer may be directly connected to a computer that transfers the article/object information, or a printer may be remotely located and accessible via a web-based or cloud-based application. In some embodiments, the article/object information is directly imported into software on the printer that executes the printing of the article/object.

The invention is not limited by the type of article/object. Indeed, any object/article that is desired to be worn may be generated utilizing the systems and methods described herein. The customized, wearable articles may be a perfect fit or they may be generated in a size that enhances or reduces the physical appearance of a subject's body or body part(s). In some embodiments, the wearable object is an article traditionally worn as clothing such as, but not limited to, shirt, blouse, vest, jacket, suit, pant, skirt, sock, hat, underwear, or other type of clothing. In other embodiments, the wearable object is an article that is worn during sport such as, but not limited to, athletic equipment (e.g., pads, guards (e.g., shin guards), helmets, protective cup, protective bra, mouth guard, masks, and the like). In still other embodiments, the article/object is a garment used for compression (e.g., for patients to wear post-surgery, or for subjects that wish to appear thinner). In some embodiments, the object is a diaper (e.g., an adult diaper). In some embodiments, the article is a mouth guard. In some embodiments, the object/article is a type of armor (e.g., used by a soldier). In some embodiments, the article is a mask (e.g., to change identity). In another embodiment, the mask is a safety mask or respirator (e.g., used to prevent the spread of infectious disease). In another embodiment, the object is a type of safety clothing or article (e.g., goggles, hazardous materials suit, etc.). In still other embodiments, the article is footwear (e.g., boots (e.g., snow boots, ski boots, etc.) shoes, sandals, etc. In some embodiments, the article is a wetsuit or drysuit. In some embodiments, the object is body armor. In other embodiments, the object is a body shield (e.g., that shields a person's body or portion(s) thereof from electrical energy, solar energy, x-ray energy, chemical energy, nuclear energy, etc). In some embodiments, the object is padding for a sport such as soccer, football, hockey (e.g., ice, field, etc.), rugby, or any contact sport in which protective padding/guards are permitted.

In some embodiments, a wearable object of the invention is a splint, cast, brace, or other type of medically related object (e.g., that is worn to immobilize, stabilize or align a portion of a subject's body). In other embodiments, the object is a medical tool or device (e.g., customized to fit a surgeon's or other type of doctor's hand (e.g., left or right hand).

Because women's undergarments are mostly made for women with A-C cup breast size with body sizes that fall into the category of small to large, there are large numbers of women that do not fall into one of the available sizes and for these women finding undergarments (e.g., lingerie) that fit properly is a challenge. Accordingly, in some embodiments, the wearable object is lingerie that is custom fit to a woman's body or portion(s) thereof.

In some embodiments, the object/article is manufactured using a single type of material. However, in other embodiments, the objet/article comprises multiple types of material in a single wearable object. In some embodiments, the article/object is made of multiple parts with the same or different material. The invention is not limited by the type of article/object comprising two or more different types of material. Indeed, any object/article described herein may be manufactured to comprise two or more (e.g., 3, 4, 5, 6, 7, 8, 9, 10, 11, 12, 13, 14, 15, 20, 25, 30, 35, 40, 50, 60, 70, 80, 90, 100, or more different types of material in the article/object. For example, in some embodiments, the wearable object/article is a shirt made/printed with elastic material as well as solid/rigid material (e.g., used as structure within shirt (e.g., to maintain or assist in maintaining a healthy posture of subject wearing the shirt (e.g., used by individuals wishing to practice good posture habits or in lieu of a brace traditionally worn by individuals with spinal scoliosis))). In other embodiments, customized athletic equipment is manufactured utilizing the processes and methods of the invention. For example, football, hockey or other type of padding and/or helmets may be manufactured according to the invention such that the padding objects/articles contain two or more different types of material (e.g., a rigid, strong outer layer and a soft, rubber-like soft inner layer). The different types of materials may be present in a single layer, or, in other embodiments, different layers are used for each of the different materials. The thickness (or thinness) of a layer may be any thickness at which a printer is able to print the material (e.g., anywhere between about 10 microns to about 5 or more inches thick, although thinner, more fine (e.g., less than 10 microns thick) as well as thicker (e.g., greater than 5 inches) layers may be used.

The invention is not limited by the type of material used for printing a wearable object/article. Indeed, the art knows well that many materials exist for use in printing (e.g., 3D printing). Materials may be any rubber, rigid, opaque (e.g., an any desired color), transparent, or any other type of material available in the art. Indeed, any material available in the art (e.g., carbon fiber, fiberglass, nylon, thermoplastic, rubber, metal, wood, limestone, etc.) may be utilized in the systems and methods of the invention.

In some embodiments, a material used is specifically chosen such that an object/article, when manufactured with the material, acts to reflect and/or block means of sensing (e.g., infrared sensor, heat sensor, biometric sensor, etc.) the presence and or state of a subject. In such a way, a subject may utilize one or more articles/objects of the invention in order to remain undetected (e.g., subject who wishes his/her presence remains undetected or who wishes his/her biometric state remains undetected) in certain environments. Similarly, wigs, masks or other types of articles/objects may be generated according to the invention and utilized by a subject in order to elude identification of the presence and/or biometric state of the subject.

In some embodiments, a material utilized in the manufacture/printing of an object/article is a stretchable material. The material utilized in the manufacture/printing of an object/article may be an antimicrobial material (e.g., due to the shape and/or consistency of the material used). In other embodiments, the material utilized in the manufacture/printing of an object/article is an absorbent material (e.g., for articles/objects that serve as diaper (e.g., adult diaper)). In some embodiments, the material utilized in the manufacture/printing of an object/article is chosen due to its elasticity, comfort and/or strength. The material utilized in the systems and methods of the invention (e.g., for printing an article/object) can be any material capable of being printed that is available, or that becomes available, in the art.

Printers utilized in the systems and methods of the invention are known in the art and include, but are not limited to, printers manufactured, designed, and/or sold by STRATASYS, Inc., MARK FORG3D, HEWLETT-PACKARD, Inc., MAKERBOT, Inc., 3D-SYSTEMS, Corp., The EXONE Company, VOXELJET AG, GROUP GORGE, Inc., CAMTEK LTD., ORGANOVO Holdings, Inc., or any other printer provider known in the art.

In some embodiments, articles/objects are created/customized and printed locally. In other embodiments, articles objects are created/customized on a user's computer, and then sent to and/or printed at a remote printer (e.g., from an on-line manufacturing and/or distribution facility).

The methods and systems described herein can be implemented in numerous ways. In one embodiment, the methods involve use of a communications infrastructure, for example the internet. Several embodiments of the invention are disclosed and described herein (e.g., that utilize the internet). However, the invention is not so limited. It is also to be understood that the present invention may be implemented in various forms of hardware, software, firmware, processors, distributed servers (e.g., as used in cloud computing) or a combination thereof, whether such computers and/or servers are located locally or accessible over the internet. The methods and systems described herein can be implemented as a combination of hardware and software. The software can be implemented as an application program tangibly embodied on a program storage device, or different portions of the software implemented in the user's computing environment (e.g., as an applet) and on the 3D printer service computing environment, where the 3D printer service may be located at a remote site (e.g., accessible via the internet) or locally (e.g., over a local area network connection).

For example, during or after acquisition of image data and/or virtual image (e.g., regarding an object or a subjects body or portion thereof), portions of the data processing can be performed in the subject/user-side computing environment. For example, the subject/user-side computing environment can be programmed to provide a virtual object and/or object set (e.g., groups of similar objects); processing of data (e.g., using a creation tool that allows customization of the object according to image data encoded in a virtual image), where the processed data is transmitted as processed or partially processed responses to the creation tool of the subject/user-side computing environment in the form computer readable script (e.g., for subsequent printing of a customized object (e.g., on a 3D printer located on a LAN or accessible over the internet).

The programs for executing algorithms described herein may be uploaded to, and executed by, a machine comprising any suitable architecture. In general, the machine involves a computer platform having hardware such as one or more central processing units (CPU), a random access memory (RAM), and input/output (I/O) interface(s). The computer platform also includes an operating system and microinstruction code. The various processes and functions described herein may either be part of the microinstruction code or part of the application program (or a combination thereof) which is executed via the operating system. In addition, various other peripheral devices may be connected to the computer platform such as an additional data storage device and a 3D printing device.

As a computer system, the system generally includes a processor unit. The processor unit operates to receive information, which generally includes image data and/or virtual image information (e.g., specific size, shape, scale, dimension, color, etc.), virtual object/article information, and/or creation tool information. Information received can be stored at least temporarily in a database (e.g., locally or remotely).

Part or all of the input and output data can also be sent electronically; certain output data can be sent electronically or telephonically (e.g., by facsimile, e.g., using devices such as fax back). Exemplary output receiving devices can include a display element, 3D printer, a facsimile device and the like. Electronic forms of transmission and/or display can include email, interactive television, and the like. In some embodiments, all or a portion of the input data and/or all or a portion of the output data are maintained on a server for access. The results may be accessed or sent to third parties (e.g., third party printers) as desired.

A system for use in the methods described herein generally includes at least one computer processor (e.g., where the method is carried out in its entirety at a single site) or at least two networked computer processors (e.g., where image data and/or virtual image information are obtained at one site) and transmitted to a remote site to a second computer processor for analysis (e.g., a computer that houses virtual article or article sets, a creation tool, etc.), where the first and second computer processors are connected by a network (e.g., via an intranet or internet). The system can also include a user component(s) for input; and a reviewer component(s) for review of data, and generation of reports. Additional components of the system can include a server component(s); and a database(s) for storing data (e.g., as in a database of virtual image information and/or article or article sets or creation tool information). The computer processors can be processors that are typically found in personal desktop computers (e.g., IBM, Dell, Macintosh), portable computers, mainframes, minicomputers, tablet computer, smart phone, or other computing devices.

The input components can be complete, stand-alone personal computers (e.g., connected to image data acquisition means (e.g., a 3D scanner, camera, other device described herein) offering a full range of power and features to run applications. The user component can operate under any desired operating system and includes a communication element (e.g., a modem or other hardware for connecting to a network using a cellular phone network, Wi-Fi, Bluetooth, Ethernet, etc.), one or more input devices (e.g., a keyboard, mouse, keypad, or other device used to transfer information or commands), a storage element (e.g., a hard drive or other computer-readable, computer-writable storage medium), and a display element (e.g., a monitor, television, LCD, LED, or other display device that conveys information to the user). The user enters input commands into the computer processor through an input device. In one embodiment, the user interface is a graphical user interface (GUI) (e.g., written for web browser applications).

The server component(s) can be a personal computer, a minicomputer, or a mainframe, or distributed across multiple servers (e.g., as in cloud computing applications) and offers data management, information sharing between clients, network administration and security. The application and any databases used can be on the same or different servers. Other computing arrangements for the user and server(s), including processing on a single machine such as a mainframe, a collection of machines, or other suitable configuration are contemplated. In general, the user and server machines work together to accomplish the processing of the present invention.

Where used, a database(s) is usually connected to a database server component and can be any device which will hold data. For example, a database can be any magnetic or optical storing device for a computer (e.g., CDROM, internal hard drive, tape drive). The database can be located remote to the server component (with access via a network, modem, etc.) or locally to the server component.

Accordingly, in some embodiments, the present invention provides a system, method, and software that permits a user to create a customized object/article locally (e.g., using means described herein for capturing subject data/information, transfer and/or downloading of the subject data/information (e.g., regarding a subject's body or portion(s) thereof) to a local or remote pc, means described herein for converting the subject data/information into a virtual image (e.g., using a 3D scanner or use of AUTOCAD or similar software described herein to create a virtual image on the local pc), means of using the virtual image to create a customized, virtual article/object on the local pc (e.g., using a software/creation tool on the local pc (e.g., that permits creating an article/object and/or for selecting an article/object from a list and customizing the article/object based upon the virtual image), sending the virtual article/object to a local printer (e.g., connected directly to the local pc), printing the article/object and subsequently enjoying the ability to use (e.g., wear) the article/object (e.g., as shown in the process flow diagram of FIG. 1).

In some embodiments, the present invention provides a system, method, and software that permit a user to create a customized object/article (e.g., using means described herein for capturing subject data/information, transfer and/or downloading of the subject data/information (e.g., regarding a subject's body or portion(s) thereof) to a remote data server, means described herein for converting the subject data/information into a virtual image (e.g., use of a 3D scanner or use of AUTOCAD or similar software described herein to create a virtual image on the remote data server), means of using the virtual image to create a customized, virtual article/object (e.g., using a software/creation tool (e.g., that permits creating an article/object and/or for selecting an article/object from a list and customizing the article/ object based upon the virtual image), sending the virtual article/object to a printer (e.g., local and/or remote printer (e.g., connected via the internet), printing of the article/object (e.g., locally or remotely), and if printed remotely, shipping of the article/object to a subject.

Figure 2:
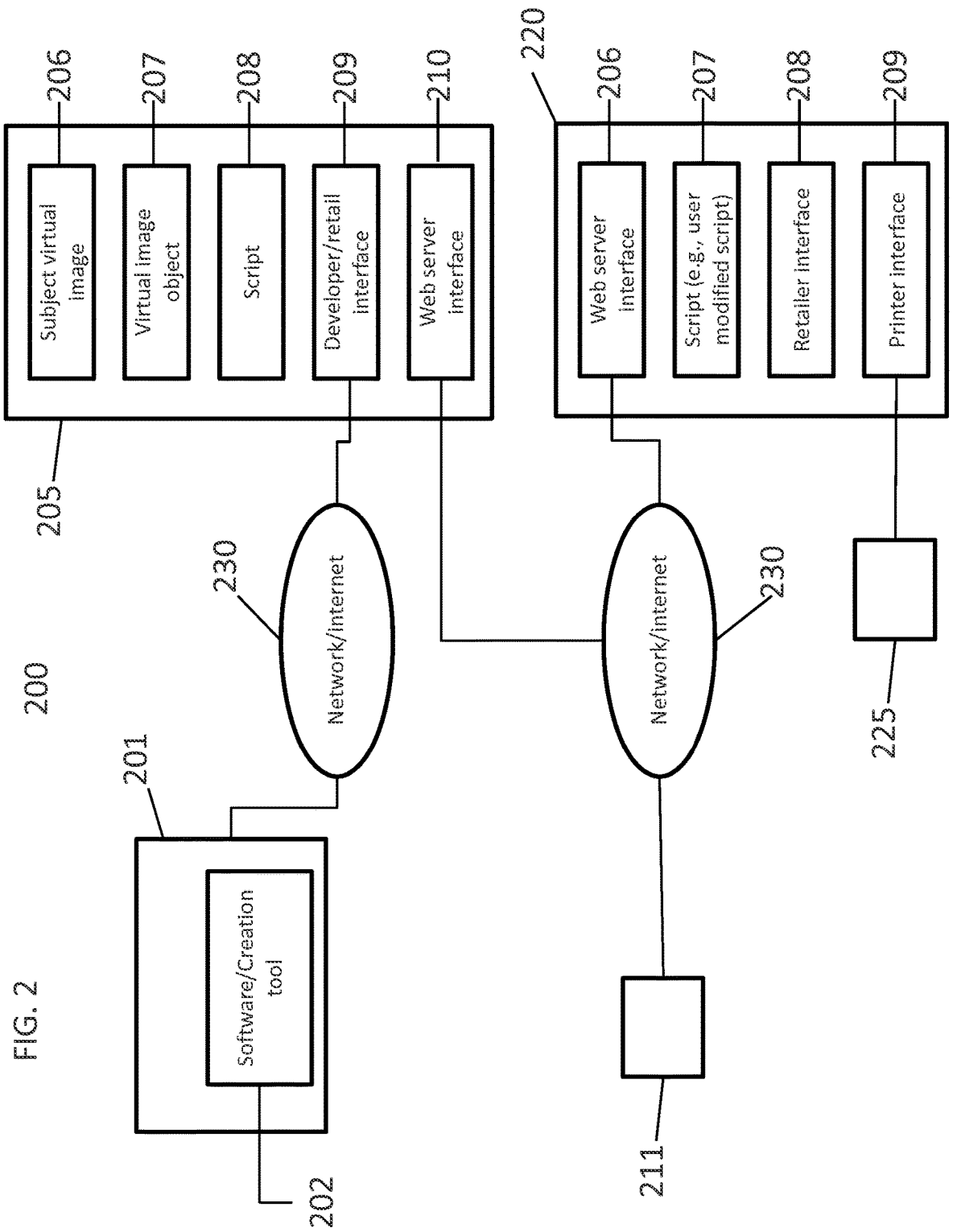
FIG. 2 shows a schematic outline of a networked system for use with customized manufacturing processes of the invention.

For example, as shown in FIG. 2, in some embodiments, the system 200 includes a software/creation tool 202 located on a retailer/developer computer 201 used by retailers and/or developers of article/objects to create a computer-readable script (e.g., encoding the virtual article/object), described herein, for the customizable article/object. In some embodiments, the software/creation tool 202 comprises a software program that runs on the developer's/retailer's computer 201, a local pc (e.g., as described above), or on a server 205 (e.g., a data server) connected (e.g., via a network (e.g., the internet 230)) to developer's/retailer's computer 201. In some embodiments, the system 200 comprises a data server 205 that contains subject virtual image storage 206, virtual article/object storage 207, script storage 208, developer/retailer interface 209 and/or a web server interface 210. In some embodiments, the software/creation tool 202 interfaces with the data server 205 via a developer interface 209, whereas a subject desiring object/article (e.g., an end user of the system) can use subject's computer 211 to interface with the data server 205 via the internet 230 and web server interface 210.

In some embodiments, the system 200 includes a print/order management server 220 that receives and/or processes computer-readable script (e.g., print/order management server 220 receives and processes script encoding the virtual article/object (e.g., created by user and/or customized by user using article/object from a list) and sends instructions to printer(s) 225 via a printer interface 223 to print article/object). In some embodiments, the print/order management server 220 stores script encoding the virtual article/object in script storage 221. A subject desiring object/article (e.g., an end user of the system) 211 can interface with system 200 via the internet 230 and web server interface 224. The print/order management server 220 can interface with a retailer via retailer interface 222. The print/order management server 220 may be accessible locally (e.g., directly connected to a subject's computer or available in a LAN) or be accessible remotely (e.g., via the internet 230). The invention is not limited by the components of the features of the system shown in FIG. 2. Indeed, various systems can be utilized together with the methods and systems of the invention. For example, in one embodiment, systems and methods of the invention are utilized together with methods of authenticating or printing an object as described in U.S. Patent Publication No. 20140156053A1, published Jun. 5, 2014.

Similarly, the invention is not limited by the type of article/object or the way in which a subject utilizes the systems provided herein. In some embodiments, a retailer/developer creates one or more virtual articles/objects (e.g., a virtual article/object set (e.g., any one or more of which is customized (e.g., using subject virtual data and a creation tool) by a subject/user to create a customized wearable article/object). The article/object set includes at least one base article/object image (e.g., virtual image) that can have zero or more other graphical features/elements that can be added to the base article/object image(s). Using software creation tool 202, a retailer/developer creates a computer-readable script file that specifies how to generate an image based on article/object image set. In particular, the computer-readable script can reference the article/object image set and specify (i) a plurality of variables that can be inputted by a user and (ii) the way such variables are used to customize the article/object. Variables include, but are not limited to, size, shape, texture, material, layering, etc. (e.g. that can be added to and/or used to modify the article/object image). In one embodiment, the script file created by developer/retailer includes a default value for each of the variables (e.g., default values based on average size/dimension in a population, or default values based upon size/dimensions information present in an acquired 3D image of subject's body or portion thereof). The computer-readable script can also include instructions for generating a graphical user interface via which a user can modify the variable article/object data in the script. In preferred embodiments, the computer readable script includes instructions for using specific dimension and sizing measurement information/data regarding the part or parts of a subject obtained from subject virtual image/model (e.g., obtained from 3D scanner and/or from SOLIDWORKS, AUTOCAD or similar software). In this way the computer readable script allows a user to utilize a subject's image data/information (e.g., subject's captured information (e.g., shape, scale, size, dimensions, color, etc.) related to a subject's body or portion(s) thereof of subject virtual image/model) to modify/customize (e.g., via a graphical user interface) the variable article/object data in the script.

In some embodiments, the software creation tool 202 generates multiple resolutions of the article/object set, ranging from a high-resolution version (e.g., used for printing the article/object) to lower-resolution versions (e.g., used for downloading to a web browser). A developer/retailer can provide the script and article/object set to the data sever 205 via the developer interface 209, and the data server 205 can store the script file and article/object set.

In some embodiments, when a user's computer requests one or more web pages provided by data server 205 via web server interface related to article/object customization, the data server 205 downloads the script file and the article/object set with the webpage(s). User's web browser, in some embodiments, runs the computer-readable script and generates a graphical user interface based on the computer-readable script. User can modify the variable article/object data (size, shape, texture, material, layering, etc.) in the script file via the graphical user interface. In one embodiment, generating the graphical user interface includes displaying a template, or starting version, for the customizable article/object using a default setting in the script file. The user is then able to customize the template via the graphical user interface. By modifying the template in the graphical user interface, the user is editing the script file. As the user makes changes, the changes are illustrated in the graphical user interface, and saved (e.g., locally or remotely) in the script file.

In some embodiments, when a user elects to save the customized article/object, the modified script file is sent back to data server 205. In some embodiments, when a user elects to save the customized article/object, the modified script file is saved on a local computer (e.g., it is not sent back to the data server). All user changes are reflected in the modified script file (user modified script file). In some embodiments, the data server stores user modified script files for each specific user such that a user can at some point in the future re-access the user modified script file (e.g., in order to re-order or to re-customize the article/object). In an alternate embodiment of the invention, every time a user makes a change to the script file via the graphical user interface, the change is automatically saved on the data server.

In some embodiments, a user orders an article/object. In other embodiments, a user can elect to share the customized article/object with others (e.g., via the internet). In some embodiments, in response to a user ordering an article/object, the print/order management server coordinates the printing of the article/object using the user modified script file (e.g., stored on the data server). The user modified script file can be utilized to print the article/object on any printer accessible to the print/order management server (e.g., via the internet). In some embodiments, a unique identifier is created by the print/order management server to more readily identify a user modified script file and/or for security (e.g., identification) reasons. In further embodiments, the unique identifier (e.g., URL) is sent to a printing vendor (e.g., the print vendor is sent a URL that includes a unique identifier for a user modified script file) and the printing vendor prints the article/object only when the vendor clicks the URL. In some embodiments, a user directly instruct a vendor's printer to print an article/object (e.g., encoded by a user modified script (e.g., present on a data server or on a user's computer)). In other embodiments, a user instructs a vendor that the user would like an article/object (e.g., encoded by a user modified script (e.g., present on a data server or on a user's computer), and the vendor instructs a vendor's printer to print the article/object. Once an article/object is printed, any means of shipping the article/object known in the art can be used to deliver the article/object (e.g., to a user or elsewhere (e.g., using couriers such as DHL, FEDEX, UPS, USPS, or other courier)).

In another embodiment, a retailer, merchant or other type of provider can provide and/or charge a user for any one or more of the various steps of the methods described herein. For example, a retailer, in one embodiment, can make available to a user a virtual article/object set (e.g., via a website) for a charge. In another embodiment, a retailer can allow a user to print an article on a retailer's 3D printer (e.g., accessed via the internet) and subsequently ship the printed article to the user. The invention is not limited by the means used to pay for the article/object. Indeed, any means known in the art can be used including, but not limited to, cash, check, credit card, PAYPAL, BITCOIN, or the like. For example, to the extent that a subject interacts with other servers and/or computers (e.g., via the internet), servers and/or computers may contain software and/or products that monitor, record and invoice a subject for work performed on the server/computer or connected peripherals (e.g., printing of article/garment on a 3D printer), and/or for the shipping of materials.

Various modifications and variations of the described compositions and methods of the invention will be apparent to those skilled in the art without departing from the scope and spirit of the invention. Although the invention has been described in connection with specific preferred embodiments, it should be understood that the invention as claimed should not be unduly limited to such specific embodiments. Indeed, various modifications of the described modes for carrying out the invention that are obvious to those skilled in the relevant fields are intended to be within the scope of the present invention.

What is claimed is:

1. A method of manufacturing a customized wearable article comprising:
    a) obtaining image data regarding a subject's body or portion thereof, wherein the image data comprises information selected from shape, size, scale and dimension;
    b) creating a three dimensional (3D) virtual image of the subject's body or portion thereof using the image data regarding the subject's body or portion thereof;
    c) modifying the 3D virtual image in order to augment, reduce, or otherwise change a feature of the subject's body or portion thereof; and
    d) utilizing the modified 3D virtual image to create a virtual customized wearable article comprising:
        1. selecting a virtual wearable article from an article set;
        2. customizing the virtual wearable article utilizing the modified virtual image of the subject of step (c); and
        3. printing the virtual customized wearable article using a three dimensional (3D) printer to create the customized wearable article.

2. The method of claim 1, wherein the image data regarding the subject's body or portion thereof is acquired by a 3D scanner and is transferred to a computer aided design (CAD) program.

3. The method of claim 2, wherein the CAD program is used for modifying the 3D virtual image.

4. The method of claim 3, wherein the step of customizing the virtual wearable article utilizing the modified 3D virtual image comprises the step of customizing a feature of the virtual wearable article selected from size, shape, and/or thickness.

5. The method of claim 1, wherein the article comprises a single type of material, two or more types of material, and/or two or more layers.

6. The method of claim 1, wherein a creation tool is utilized to create a computer readable script that includes information regarding the modified 3D virtual image.

7. The method of claim 6, wherein the computer readable script identifies the virtual wearable article from the article set and utilizes the image data of the modified 3D virtual image to customize the virtual wearable article.

8. The method of claim 6, wherein the computer readable script encodes a graphical user interface through which a user can modify virtual wearable article data in the computer readable script.

9. The method of claim 1, wherein the step of customizing the virtual wearable article utilizing the modified 3D virtual image utilizes software, located on a local computer or on a remote retailer's server accessible via the internet, that modifies a virtual wearable article from an article set with information selected from size, shape, scale and dimension encoded within the modified 3D virtual image.

10. The method of claim 9, wherein information encoding the virtual wearable article is stored on a retailer's data server.

11. A customized wearable article generated by the method of claim 1.

12. The customized wearable article of claim 11, wherein the customized wearable article reduces the apparent size of the subject's waist when worn by the subject.

13. The customized wearable article of claim 11, wherein the customized wearable article augments the apparent size of the subject's chest when worn by the subject.

* * * * *